March 10, 1959     R. H. COWLES     2,876,485
INTERLOCKING ASSEMBLY
Filed Dec. 3, 1954

INVENTOR.
RAYMOND H. COWLES
BY Evans & McCoy
Attorneys

United States Patent Office 2,876,485
Patented Mar. 10, 1959

2,876,485

INTERLOCKING ASSEMBLY

Raymond H. Cowles, Wabash, Ind., assignor to The General Tire and Rubber Company, Akron, Ohio, a corporation of Ohio Application December 3, 1954, Serial No. 472,869

3 Claims. (Cl. 16—42)

This invention relates to interlocking assemblies and more particularly to an assembly in which a member having a stud is automatically locked to a member having a socket by means of a resiliently yieldable locking element with which the stud engages upon insertion of the stud into the socket.

The device of the present invention is an interlocking assembly which includes a member that is provided with an integral projecting stud, a member having an opening that serves as a socket to receive the stud, and an elastic rubber bushing that has locking engagement with both the stud and the socket member when the three elements are assembled. The elastic rubber bushing has a tubular body portion that fits in the opening of the socket member and is provided at one end with a flat shoulder flange that engages one face of the socket member around the socket opening. The tubular portion of the bushing is of a length to extend through the opening and to project a short distance past the face of the socket member opposite that engaged by the bushing flange.

In assembling the parts the rubber bushing is first placed in the opening of the socket member and the stud is then inserted into the flanged end of the bushing. The member carrying the stud has a shoulder portion surrounding the base of the stud that is engageable with the shoulder flange of the rubber bushing and the stud has an enlarged head that is of a diameter greater than the internal diameter of the bushing, but less than the diameter of the opening, so that it can be forced axially through the elastic bushing after the bushing is placed in the opening. The outer portion of the stud head is tapered to facilitate its entry into the bushing and its passage through the bushing and at its inner end provides a circumferential shoulder around the stud that is spaced from the shoulder portion of the stud carrying member a distance less than the length of the bushing so that when the stud is fully entered into the bushing the head is within the end of the bushing that projects beyond the opening. Since the diameter of the stud head is greater than the normal internal diameter of the bushing, the end portion of the bushing that surrounds the enlarged head of the stud is expanded to a diameter greater than that of the opening to lock the members together. The portion of the stud inwardly of the circumferential shoulder is preferably of a diameter greater than the internal diameter of the bushing so that the portion of the elastic bushing surrounding the stud and the opening is under radial pressure that causes it to expand axially and to exert an axial pressure on the stud shoulder to draw the shoulder portion of the stud member into clamping engagement with the shoulder flange of the bushing.

The socket and stud may be parts of members of various kinds that are to be joined together. The socket member may be in the form of a single plate or superposed plates and, when a plurality of plates with registered openings are superposed, the stud member and bushing may serve merely to secure the superposed plates together. The stud may be part of a supported member or part of a support to which a member is attached. Regardless of the form of the stud and socket members, the assembly is effected by first inserting the bushing into the opening of the socket member and then attaching the stud member to the socket member by forcing the stud axially into the flanged end of the elastic rubber bushing. Since water serves as a lubricant for rubber, the passage of the enlarged head of the stud through the bushing may be facilitated by wetting the head with water prior to its insertion into the bushing. After assembly, the members are securely fastened together, much greater force being required to pull the stud out than was required to push it in. However, the stud may be withdrawn by means of a suitable tool without damage to the parts.

The invention has for its object to provide a simple and inexpensive interlocking assembly which permits members to be secured together merely by pressing the parts into engagement.

A further object is to provide an interlocking assembly in which rigid members are locked together by means of an elastic cushioning element interposed between them.

Reference should be had to the accompanying drawings forming a part of the specification, in which.

Figure 1:
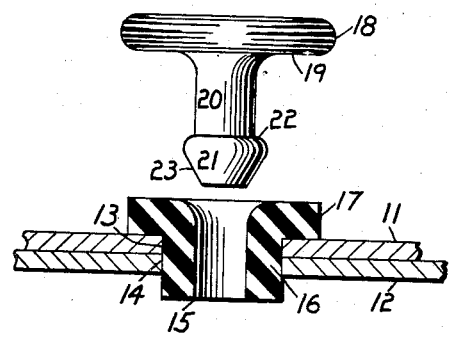
Figure 1 is a view showing a socket member in the form of two superposed plates with registered openings having an elastic bushing fitting in the openings, a stud member being shown with its stud in alinement with the bushing for insertion into the bushing by axial movement.
Figure 2:
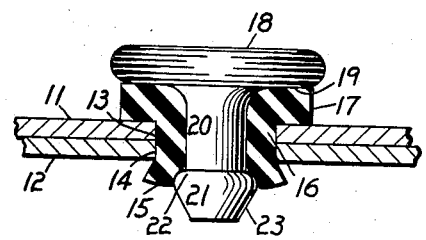
Fig. 2 is a sectional view showing the assembly interlocked by the insertion of the stud into the bushing.

In Figs. 1 and 2 of the drawings, superposed plates 11 and 12 are provided with registered openings 13 and 14 which provide a socket to receive an elastic rubber bushing 15. The bushing 15 has a tubular body 16 that slidably fits in the openings 13 and 14 and is provided at one end with a flat shoulder flange 17 that overlies one of the plates around its opening. As shown in Fig. 1, the tubular portion 16 of the bushing is of a length to extend through the openings 13 and 14 and to project a short distance past the outer face of the plate 12. The bushing serves as a locking member for securing a stud carrying member 18 to the plates 11 and 12. The member 18 has a flat shoulder forming portion 19 that is engageable with the shoulder flange 17 of the bushing and has an integral stud 20 that is provided with an enlarged head 21 which provides a circumferential shoulder 22 surrounding the stud 20 at its inner end and which has a tapered outer end portion 23. The diameter of the enlarged head 21 is greater than the internal diameter of the bushing 15 and less than the diameter of the openings 13 and 14. The tapered end 23 of the head may be inserted into the flanged end of the elastic rubber bushing 15 and may be forced by axial pressure applied thereto through the bushing. The shoulder 22 of the stud is spaced from the shoulder portion 19 a distance less than the length of the bushing 15 so that when the stud is fully inserted into the bushing as shown in Fig. 2, the enlarged head 21 is within the projecting end of the tubular portion 16 of the bushing. The portion of the bushing that surrounds the head 21 is expanded to an external diameter greater than the diameter of the opening 14, so that the bushing 15 and stud member 18 are locked to the plates 11 and 12.

The portion of the stud 20 inwardly of the shoulder 22 is preferably of a diameter greater than the internal diameter of the bushing 15, so that the portion of the bushing between the exterior of the stud and the wall of the opening is under radial pressure which causes the bushing to expand axially and exert an axial pressure on the shoulder 22 to draw the shoulder portion 19 into clamping engagement with the shoulder flange 17 of the bushing. It will be apparent that the bushing and stud member may serve to fasten the plates 11 and 12 together or that the plates 11 and 12 and the stud member 18 may be parts of members that are to be attached together.

Figure 3:
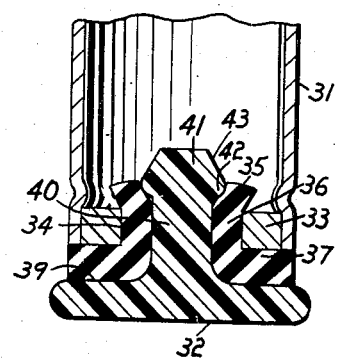
Fig. 3 is a sectional view showing an assembly in which the socket member is at the lower end of a hollow chair leg and the stud member is a floor engaging tip that is connected to the socket member by means of an elastic locking and cushioning member.

In Fig. 3 of the drawings, the invention is shown applied to an attachment between a chair leg and a floor engaging tip. The lower end portion of the hollow chair leg 31 is shown which has a floor engaging tip 32 secured to its lower end. The chair leg 31 has a socket member 33 secured in the lower end thereof and this member is in the form of a plate with a central opening 34 to receive an elastic rubber bushing 35. The bushing 35 has a tubular body 36 that fits in the opening 34 and a flat shoulder flange 37 that engages the under side of the socket member 33, the body 36 extending a short distance above the top face of the socket member 33.

The floor engaging portion of the tip 32 is in the form of a flat circular disk having a top shoulder forming face 39 that is engageable with the shoulder flange 37 and a central integral stud 40 that is received within the tubular body portion 36 of the bushing.

As in the modification first described, the stud has an enlarged head 41 that is of a diameter greater than the internal diameter of the bushing and less than the diameter of the opening 34 and that provides a shoulder 42 that is positioned slightly above the top face of the socket member 33 when the stud is fully inserted into the bushing, the head having a tapered upper end 43 to facilitate its entry into the bushing.

The stud members and socket members of the assembly of the present invention may be formed of any suitable rigid material such as metal or plastic. The shape of the socket opening is shown cylindrical in the drawings and the body portion of the stud and the tubular portion of the bushing are also cylindrical. The cylindrical form of opening is obviously the most convenient, but it is not essential to the invention that the opening be cylindrical since the bushing and stud could readily be shaped to conform to openings of various shapes.

It is to be understood that in accordance with the provisions of the patent statutes, variations and modifications of the specific devices herein shown and described may be made without departing from the spirit of the invention.

What I claim is:

1. An interlocking assembly comprising a socket member having an opening through it, a stud member that has a shoulder portion that overlies a face of the socket member around said opening and a stud integral with said shoulder portion and extending through said opening, said stud having an enlarged head integral therewith that is of a diameter less than that of the opening and that provides a circumferential shoulder around the stud a short distance beyond the opposite face of said socket member, and an elastic rubber bushing having a circumferentially continuous tubular body portion that receives said stud and that fills the space between the stud and the wall of said opening, said bushing having a circumferential flange at one end interposed between said shoulder portion and said socket member around said opening, the opposite end of said bushing extending past said circumferential shoulder of the stud and being expanded by said head to an external diameter greater than the diameter of said opening immediately adjacent said opposite face of the socket member to lock said stud member to said socket member.

2. Interlocking means for securing a floor engaging tip to the lower end of a chair leg comprising a socket member secured within the lower end of said leg and having an opening through it, an elastic bushing that has a tubular body formed to slidingly fit within said opening and of a length greater than the thickness of said socket member, said bushing having a circumferential shoulder flange engaging the bottom face of said socket member around said opening, and a floor engaging tip having a shoulder portion engageable with said shoulder flange and a stud integral with said shoulder portion and extending through said tubular portion of said bushing, said stud having a body portion of a diameter greater than the internal diameter of said bushing, and an enlarged head of a diameter less than that of said opening and providing a circumferential shoulder around said stud, said head being tapered outwardly of said shoulder to facilitate its insertion into and passage through the bushing, the distance between said shoulder portion and said stud shoulder being less than the length of said bushing and slightly greater than the distance from the outer face of said shoulder flange to the face of said socket member opposite that engaged by said shoulder flange, the portion of the tubular body of said bushing surrounding said head being expanded to a diameter greater than said opening and the portion of said bushing in said opening being under radial pressure that causes it to expand axially and exert an axial thrust on said stud shoulder to draw said shoulder portion tightly against the shoulder flange of said bushing.

3. An interlocking assembly comprising a rigid socket member having a cylindrical opening through it and a flat face surrounding the opening at one side of said member, an elastic bushing having a cylindrical tubular body of an external diameter to fit within said opening and of a length greater than the thickness of said member, said bushing having a flat circumferential shoulder flange at one end that engages said flat face, a rigid stud member having a flat shoulder portion engageable with the shoulder flange of said bushing and an integral stud extending through the tubular portion of said bushing, said stud having an enlarged head providing a circumferential shoulder around the stud, said head being of an external diameter less than the diameter of said opening and being spaced from said shoulder portion a distance less than the length of said bushing, the portion of said stud inwardly of said head being cylindrical and of a diameter greater than the normal internal diameter of said bushing, said bushing being formed for insertion axially into said opening, said enlarged head of said stud being tapered to facilitate insertion of the stud into the bushing after the bushing is placed in said opening and of a size to expand the free end portion of the tubular body of said bushing to a diameter greater than that of said opening to lock said members together, said tubular body portion of the bushing being subjected to radial pressure between said stud and the wall of said opening to expand the same radially and exert axial pressure on said circumferential stud shoulder to draw said flat shoulder portion of the stud member into clamping engagement with the shoulder flange of said bushing, said circumferential stud shoulder being rounded to permit the stud to be withdrawn through the bushing without damage to the bushing.

References Cited in the file of this patent

UNITED STATES PATENTS

| | | |
|---|---|---|
| 582,309 | McLaughlin | May 25, 1897 |
| 1,915,249 | Jorgensen | June 20, 1933 |
| 1,929,743 | Jarvis | Oct. 10, 1933 |
| 2,088,955 | Hamill | Aug. 3, 1937 |
| 2,255,971 | Hall | Sept. 16, 1941 |
| 2,367,657 | Boersma | Jan. 23, 1945 |
| 2,408,559 | Keating | Oct. 1, 1946 |
| 2,542,144 | Kearns | Feb. 20, 1951 |
| 2,555,420 | Richardson | June 5, 1951 |
| 2,592,130 | Erb et al. | Apr. 8, 1952 |